(12) United States Patent
Shoulders

(10) Patent No.: US 6,904,759 B2
(45) Date of Patent: Jun. 14, 2005

(54) LUBRICANT STILL AND RESERVOIR FOR REFRIGERATION SYSTEM

(75) Inventor: Stephen L. Shoulders, Baldwinsville, NY (US)

(73) Assignee: Carrier Corporation, Farmington, CT (US)

( * ) Notice: Subject to any disclaimer, the term of this patent is extended or adjusted under 35 U.S.C. 154(b) by 0 days.

(21) Appl. No.: 10/328,211

(22) Filed: Dec. 23, 2002

(65) Prior Publication Data

US 2004/0118132 A1 Jun. 24, 2004

(51) Int. Cl.⁷ ................................................. F25B 43/02
(52) U.S. Cl. ............................................. 62/84; 62/472
(58) Field of Search ........................... 62/84, 472, 470, 62/471, 473, 506, 515, 193, 469

(56) References Cited

U.S. PATENT DOCUMENTS 1,498,372 A    6/1924   Hartman 6,516,627 B2 * 2/2003 Ring et al. .................... 62/471

FOREIGN PATENT DOCUMENTS

DE          53 564 C       3/1890
EP          0 109 603      5/1984

* cited by examiner

Primary Examiner—Chen Wen Jiang

(57) ABSTRACT

A lubricant still for use in a compressor for separating oil from refrigerant, includes a vessel having an inlet for incoming oil laden refrigerant, an outlet for gaseous refrigerant, and an outlet for refrigerant laden oil. A separating structure is provided for separating transitioning oil laden refrigerant from the incoming oil-laden refrigerant, wherein the oil laden refrigerant progressively changes to the refrigerant laden oil closer to the outlet for refrigerant laden oil. A heating device is used for heating the incoming oil laden refrigerant and transitioning oil laden refrigerant, for facilitating the formation of the gaseous refrigerant and the refrigerant laden oil.

7 Claims, 4 Drawing Sheets

LUBRICANT STILL AND RESERVOIR FOR REFRIGERATION SYSTEM

TECHNICAL FIELD

This invention is directed to separation of lubricant from refrigerant in compressors, and more particularly, the separation of lubricant from refrigerant in a lubricant still.

BACKGROUND OF THE INVENTION

Screw or helical compressors are commonly used in air conditioning applications to compress refrigerant as part of the refrigeration cycle. Screw compressors are composed of meshing screw or helical rotors. While two rotor configurations are the most common design, screw compressors are also known in the art having three, or more, rotors housed in respective overlapping bores so as to co-act in pairs. The rotors of a typical screw compressor are mounted in bearings at each end in housing end plates at the inlet and discharge side. Refrigerant is compressed by the screw rotors toward the discharge side and discharged through ports and into a discharge line.

In normal applications, a solution or mixture of oil and refrigerant is used for lubricating screw compressor bearings and rotors. This lubricant becomes entrained in the refrigerant while the refrigerant passes through and is compressed. If this entrained lubricant is not separated and recovered by some means, it passes through condenser and liquid line and accumulates in the evaporator where it is mixed with liquid refrigerant. As a result, evaporator heat transfer effectiveness is degraded. Oil foam may also be created, which is entrained in suction flow entering the compressor, reducing the refrigerant flow rate of the compressor. Even worse, lubricant supply for bearing and rotor lubrication is eventually depleted.

In the past, oil separators have been utilized immediately downstream of the compressor. While oil separators do separate the lubricant, they have not always provided fully satisfactory results. As an example, the lubricant removed with such a separator will be at a high pressure, and may have an appreciable amount of refrigerant mixed in with the oil. This lowers its viscosity, degrading its usefulness as a bearing lubricant. The use of a separator can also cause a pressure drop in the compressed refrigerant, which is undesirable. A separator may also radiate sound due to internal pressure pulsations acting on its walls. A separator may also add considerable cost to the system since it is a pressure vessel of considerable size.

Another approach to lubricant separation is by use of a concentrator, or still, attached to the evaporator, also sometimes referred to as a generator as, shown for example in U.S. Pat. No. 6,182,467 B1. In such systems, a portion of the oil and refrigerant mix residing in the evaporator is made to flow into the concentrator, where means are provided for heating the mixture to cause some liquid refrigerant to vaporize. The liquid remaining thereby contains a higher fraction of oil. By suitable choice of the amount of refrigerant vaporized, a liquid with sufficient viscosity for use as a bearing lubricant may be created.

Referring to FIG. 3, such a prior art lubricant still is shown in detail, wherein the still 28 comprises a pressure tight vessel 30, which includes an inlet 32 for oil laden refrigerant 7, drawn off the evaporator, below the liquid level line, an outlet 34 for gaseous refrigerant, an oil outlet 36 for out flowing concentrated oil that has undergone separation. Still/reservoir 28 further includes a coil 42 through which the hot refrigerant flows for transfer of heat to the incoming oil/refrigerant mixture. Coil 42 has an inlet 38 for hot refrigerant and an outlet 40 for cooled refrigerant having gone through a heat transfer process.

The use of such stills for creating a lubricant from the oily refrigerant mix normally residing in an evaporator is a known art, with the viscosity resulting from still action in the range of 3 to 20 centipoise (cP). However, for some screw compressors, particularly those operated at low speeds, much higher lubricant viscosity of at least 50 cP is required. Approaches to achieving higher viscosity lubricants in conventional stills are less than satisfactory. For example, simply increasing the amount of heat provided to vaporize refrigerant may result in somewhat higher lubricant viscosity but may also incur a severe penalty to system efficiency since the extra heat provided must be accounted for when calculating the system efficiency. Moreover, conventional stills are defective in producing adequate lubricant viscosity during operating transients that result in sudden increases in the influx rate of oil laden refrigerant from the evaporator. During such transients the entering liquid tends to flood the still, mixing with liquid that has resided in the still for some time and lowering its viscosity.

SUMMARY OF THE INVENTION

It is an object of this invention to provide an improved lubricant still for use with a compressor for the separation of lubricant from refrigerant.

It is another object of this invention to provide an improved lubricant still that produces lubricant of high viscosity and maintains high viscosity during operating transients that result in increased flow of oil laden refrigerant from evaporator to still.

These objects, and others as will become apparent hereinafter, are accomplished by the lubricant still of the present invention for use in a compressor for separating lubricant from refrigerant. The still includes a vessel having an inlet for incoming oil laden refrigerant, an outlet for gaseous refrigerant, and an outlet for refrigerant laden oil. A separating structure is provided for separating transitioning oil laden refrigerant from the incoming oil-laden refrigerant, wherein the oil laden refrigerant progressively changes to refrigerant laden oil closer to the outlet for refrigerant laden oil. A heating device is used for heating the incoming oil laden refrigerant and transitioning oil laden refrigerant, for facilitating the formation of the gaseous refrigerant and the refrigerant laden oil.

BRIEF DESCRIPTION OF THE DRAWINGS

For a fuller understanding of the present invention, reference should now be made to the following detailed description thereof taken in conjunction with the accompanying drawings wherein.

DESCRIPTION OF THE PREFERRED EMBODIMENTS

Figure 1:
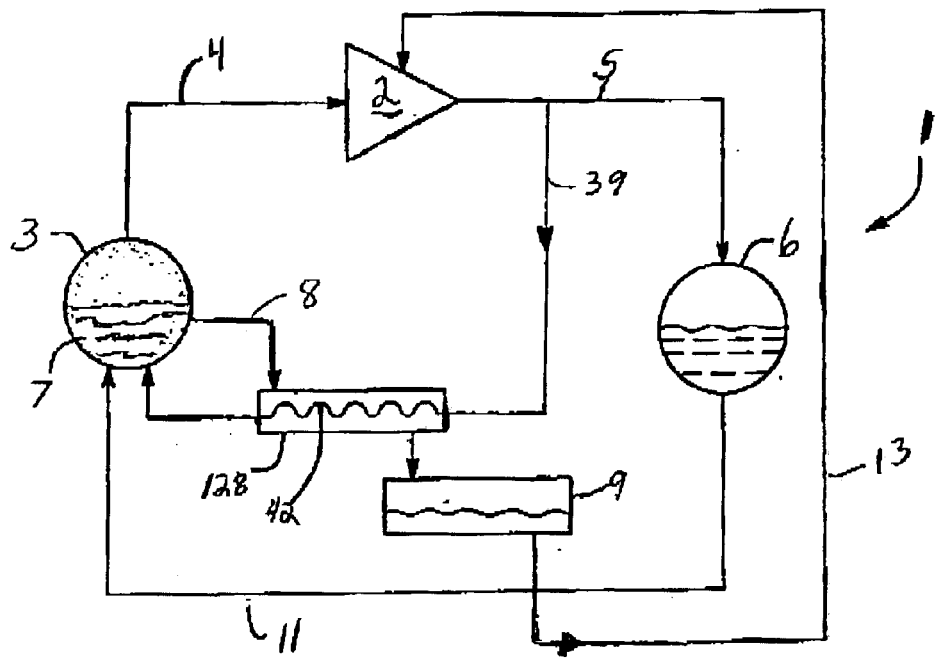
FIG. 1 is a schematic diagram of a refrigerant system.

Referring now to the drawings in detail there is shown in FIG. 1 a schematic view of a refrigerant system 1, including a compressor 2.

As is known, a flooded style evaporator 3 delivers primarily gaseous refrigerant to the compressor 2 through a line 4. Gaseous refrigerant is compressed by compressor 2, entraining lubricant during its passage through compressor 2 that is used to lubricate the bearings and rotors of compressor 2. From the compressor 2, refrigerant with entrained oil passes through a line 5 to a condenser 6. Compressed gaseous refrigerant is cooled in the condenser, transferred into a liquid phase, with oil in mixture or solution, as it passes in line 11 through an expansion valve (not shown) to evaporator 3. At the evaporator 3, an environment to be cooled is cooled by the refrigerant in the evaporator. As is shown, it is typical that liquid refrigerant 7 settles from the refrigerant in the evaporator. This refrigerant 7 is typically lubricant or oil laden as a result of the oil entrained during the compression process and associated lubrication, and a portion of the oil laden refrigerant is transferred via line 8 to lubricant still 128, described further below, according to the principle of the present invention. A portion of this lubricant is drawn off using an oil pump (not shown) and delivered to compressor 2 through line 13 for lubrication of bearings and rotors.

Figure 2:
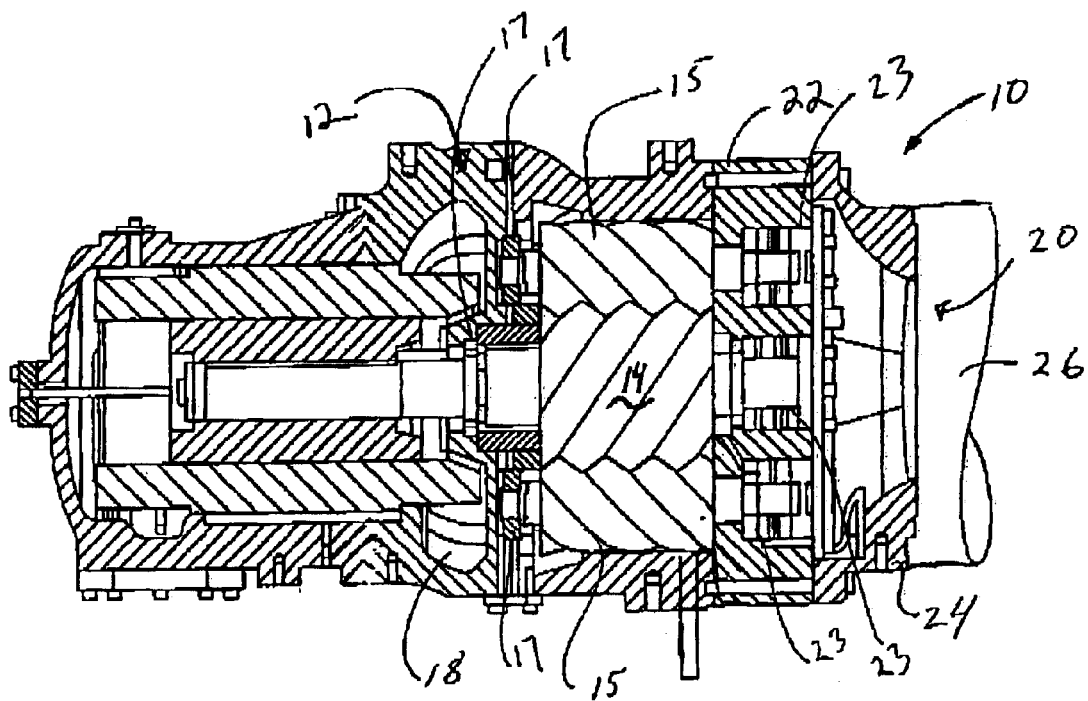
FIG. 2 is a simplified schematic view of a screw compressor showing the discharge end and connections to the discharge line.

Referring to FIG. 2, an example of how oil enters the refrigerant during the compression process will be further described. Shown in FIG. 2 is a screw compressor 10, that includes a rotor housing 12 containing intermeshing screw rotors 14 and 15 and bearings 17 on suction-side of screw rotors, refrigerant inlet 18 and discharge port 20, including a discharge bearing housing 22 containing discharge-side bearings 23 and discharge housing 24 that is connected with a discharge line 26. In operation, assuming rotor 14 to be the driving rotor, rotor 14 rotates engaging the other rotors 15, causing their rotation. The co-action of rotating rotors 14 and 15 draws refrigerant gas via suction inlet 18 into the grooves of rotors 14 and 15 that engage to trap and compress volumes of gas and deliver hot compressed refrigerant gas to discharge port 20. In addition, and simultaneously, lubricant is injected into the screw rotors for effective lubrication of the rotors, and as a result oil becomes mixed with refrigerant. Simultaneously, lubricant is also delivered to suction bearings 17 and discharge bearings 23. Some or all of bearing lubricant may also leak internally and ultimately be entrained in refrigerant passing through. The hot compressed refrigerant with the lubricant therein moves through the system 1 described above. The present invention is used to separate the lubricant from the refrigerant for use for lubricating the compressor.

While the present invention is shown being used with a screw compressor, it may also be used with other types of compressors as well.

Figure 4:
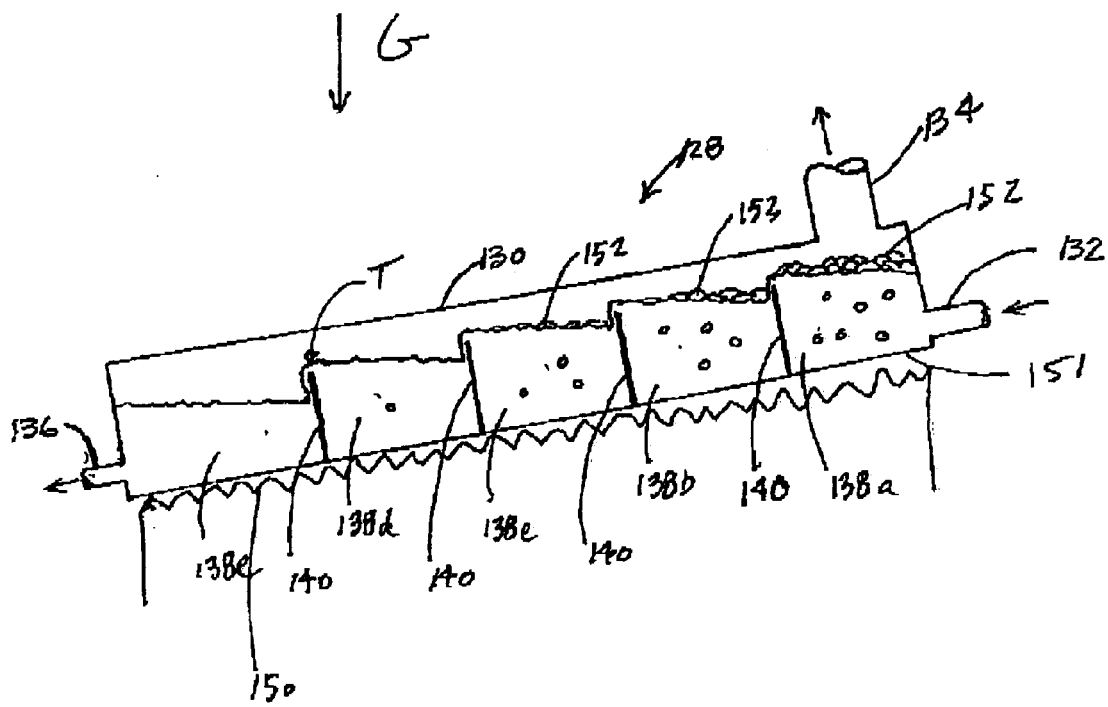
FIG. 4 is a simplified schematic view of an embodiment of a lubricant still of the present invention.
Figure 3:
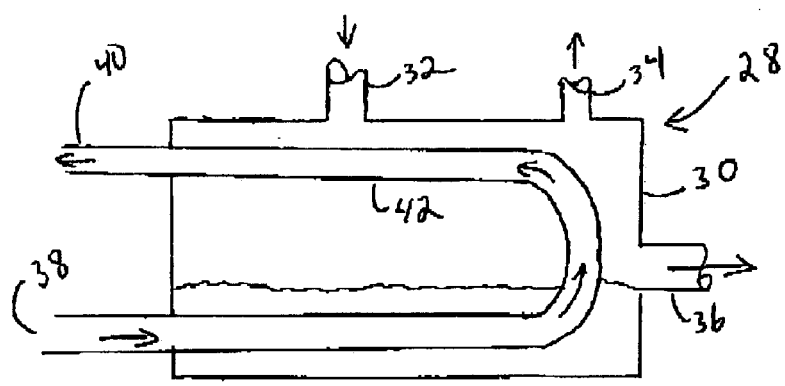
FIG. 3 is a simplified schematic view of a prior art still.

As shown in FIG. 4 and also referring to FIG. 1, an embodiment of the lubricant still of the present invention, still 128, comprises a pressure tight vessel 130, which includes an inlet 132 for oil laden refrigerant 7, drawn off the evaporator, below the liquid level line, an outlet 134 for gaseous refrigerant and a lubricant outlet 136 for out-flowing lubricant of high viscosity that has undergone separation. Still 128 includes a series of liquid reservoirs 138 created by partitions 140 acting in concert with portions of the inner wall of pressure tight vessel 130. In this embodiment, heat for vaporizing some liquid refrigerant in oil laden refrigerant 7 is provided by electric heater 150, which is in close proximity to the lower wall 151 of pressure tight vessel 130. Other arrangements for electric heaters, including locating them within vessel 130, and other means for providing heat, such as providing tubes containing hot liquid or gas refrigerant or hot water, are also compatible with this embodiment of the present invention.

Gaseous refrigerant created by heat acting on liquid in any of reservoirs 138 rises within vessel 130 and eventually exits through vent 134, which is connected (not shown) to either evaporator 3 or passage 4. Flow of liquid through still 128 is due to the effect of gravity G, wherein vessel 130 is tilted downwardly from inlet 132, as shown. In FIG. 4 flow occurs from right to left, proceeding over the top of each partition 140 and through each reservoir 138 in sequence, from 138a to 138e. The most upstream reservoir 138a in the sequence is connected to inlet 132 and typically contains a high fraction of the oil laden refrigerant 7. The most downstream reservoir in the sequence 138e is connected to lubricant outlet 136 and acts as a lubricant reservoir. The construction of partitions 140, such that flow occurs over their tops T, is an aspect of the present invention. Oil rich liquid or foam, shown typically as 152 in FIG. 4, tends to rise to the top of reservoirs 138 due to buoyancy, because the density of the liquid/foam 152 is lower than the density of other liquid present in reservoirs 138. Thus, oil rich liquid and foam flows in reservoirs 138 over the tops T of partitions 140, over the other liquid in the reservoirs. By this means, the oil concentration of the liquid in reservoirs 138 increases as flow progresses downstream in the sequence of reservoirs 138, from 138a to 138e. Through this means, a lubricant of high viscosity is developed in the most downstream reservoir 138e, which acts as a lubricant reservoir. During operating transients when the influx rate of oil laden refrigerant entering the most upstream reservoir 138a through inlet 132 increases, the liquid flow rate through still 128 also increases. However, because the liquid is refrigerant rich, its density is higher than oil rich liquids or oil rich foams 152, leading to downstream flow over the tops T of partitions by the more oil rich liquids and foams 152, as previously described. Thus, even during such transients, the progression of additional refrigerant rich liquid downstream is hindered and the high viscosity of the lubricant in the most downstream reservoir is substantially maintained.

An additional advantage in vaporizing refrigerant to create a lubricant of high viscosity may be realized by designing the reservoirs 138 such that their free surface area-to-volume ratio is as high as possible as it is known that the migration of vaporizing refrigerant from a mixture or solution of liquid refrigerant and oil is enhanced as free surface area-to-volume ratio increases. Thus, within the bounds of cost-effective construction, the depth (the measure of the reservoirs 138 into the page) and length of reservoirs 138 should be maximized relative to their height.

Figure 5:
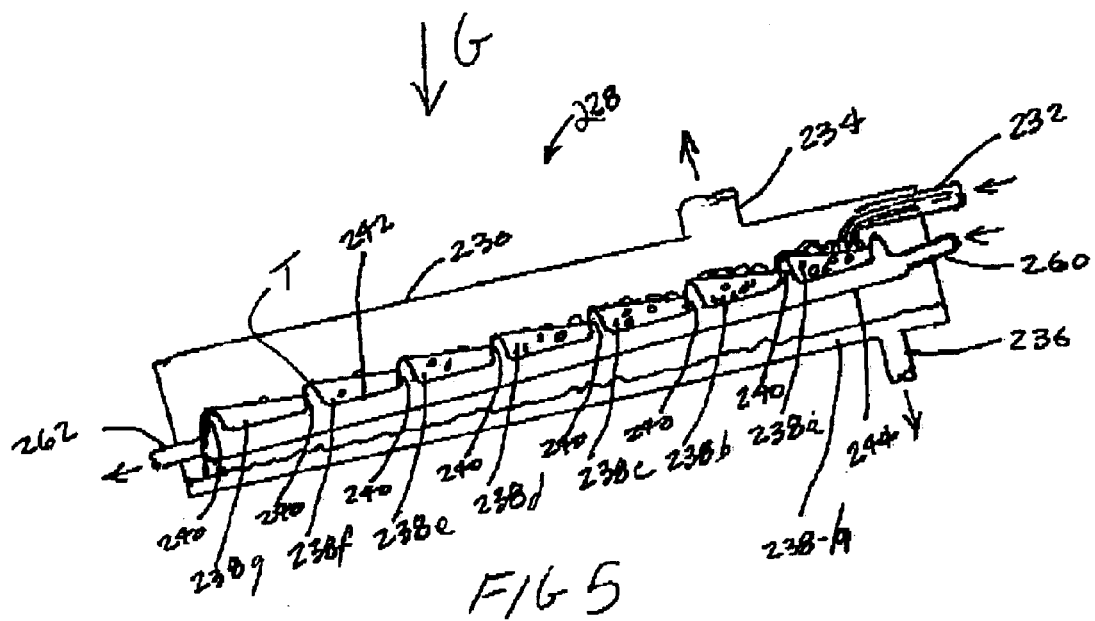
FIG. 5 is a view of the preferred embodiment of a lubricant still of the present invention.
Figure 6:
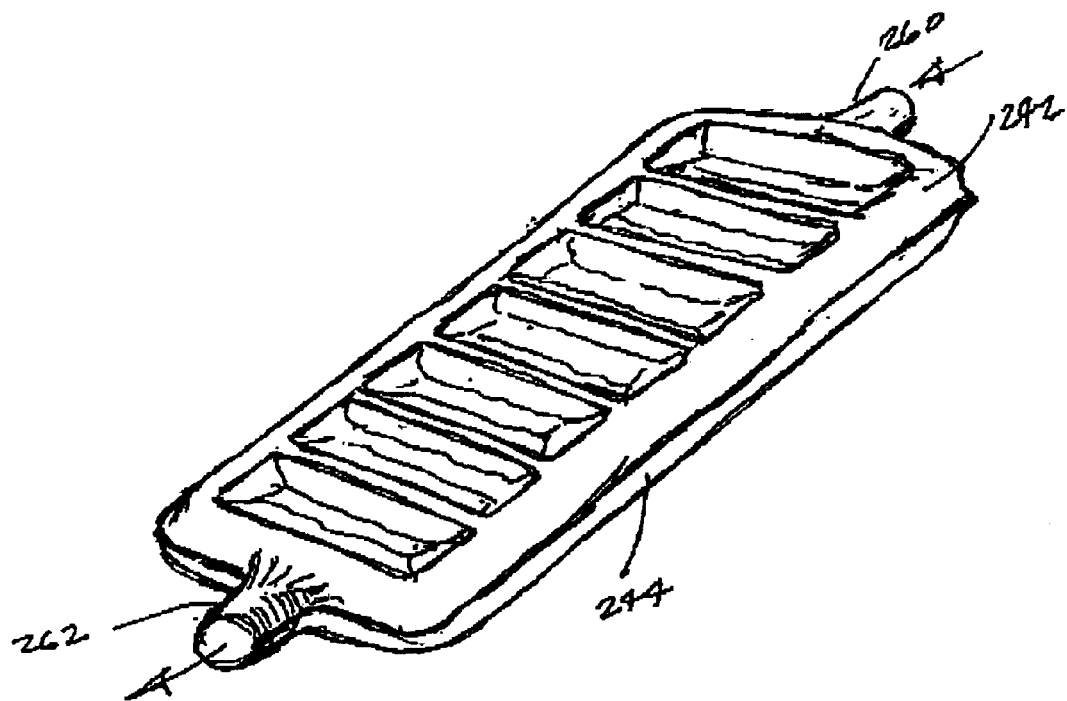
FIG. 6 is a perspective view of a component of the lubricant still shown in FIG. 5.

Another preferred embodiment is shown in FIGS. 5 and 6. Referring to FIG. 5, and also referring to FIG. 1, similar to as described above, a still 228 comprises a pressure tight vessel 230, which includes an inlet 232 for oil laden refrigerant 7, drawn off the evaporator, below the liquid level line, an outlet 234 for gaseous refrigerant and a lubricant outlet 236 for out flowing lubricant of high viscosity that has undergone separation. Still 228 further includes a series of liquid reservoirs 238a to 238g created by partitions 240. Reservoirs 238a to 238g and partitions 240 are preferably made by stamping their forms in sheet metal of relatively high conductivity such as steel, aluminum or copper to form the entire series of reservoirs 238 and entire series of partitions 240 in a single pan-shaped piece 242 of high conductivity material, having an elongated flattened shape, as shown in FIG. 6. In this embodiment heat for vaporizing some liquid refrigerant in oil laden refrigerant 7 is preferably provided by flow of hot refrigerant gas drawn off the condenser or, as shown in FIG. 1, from a tap 39 off the discharge line 5 of compressor 2, entering through an inlet 260 in FIG. 5 and exiting through outlet 262 as cooled refrigerant having gone through a heat transfer process. The refrigerant flows through an internal passage defined by the single piece 242 and a matching bottom piece 244, described further below with reference to FIG. 6. Pan 242 is fastened within vessel 230 on an angle as shown, using conventional means such as, for example, brazing, welding, bolting or shimming.

Gaseous refrigerant created by heat acting on liquid in any of reservoirs 238 rises within vessel 230 and eventually exits through vent 234, which is connected (not shown) to either evaporator 3 or passage 4. Flow of liquid through still 228 is due to the effect of gravity G and the orientation of pan 242. Referring still to FIG. 5, flow occurs from right to left beginning at inlet 232 through the series of reservoirs 238a to 238g and over the series of partitions 240, ending in the most downstream reservoir 238h. The most upstream reservoir in the sequence 238a, connected to inlet 232, typically contains a high fraction of the oil laden refrigerant 7. The most downstream reservoir 238h in the sequence is connected to lubricant outlet 236 and acts as a lubricant reservoir. The construction of partitions 240 such that flow occurs over their tops T. In other respects, aspects of the embodiment shown in FIG. 5 pertinent to creating and maintaining a lubricant of high viscosity are the same as those of the embodiment shown in FIG. 4, and previously described.

With reference to FIG. 6, the pressure-tight passage for flow of the hot refrigerant gas is made, using the single piece of high conductivity material 242 (described above) as an upper boundary and part of side boundaries for hot refrigerant gas flow and a single lower piece 244, preferably stamped from a single sheet of the same high conductivity material as 242 is formed from, as a lower boundary and forming part of the side boundaries. 242 and 244 are suitably joined in a pressure-tight manner, preferably also by brazing. Inlet 260 and outlet 262 may suitably be joined in a pressure tight manner to the assembly of 242 and 244, preferably by brazing or could be formed as an integral part of pieces 242 and 244.

Figure 7:
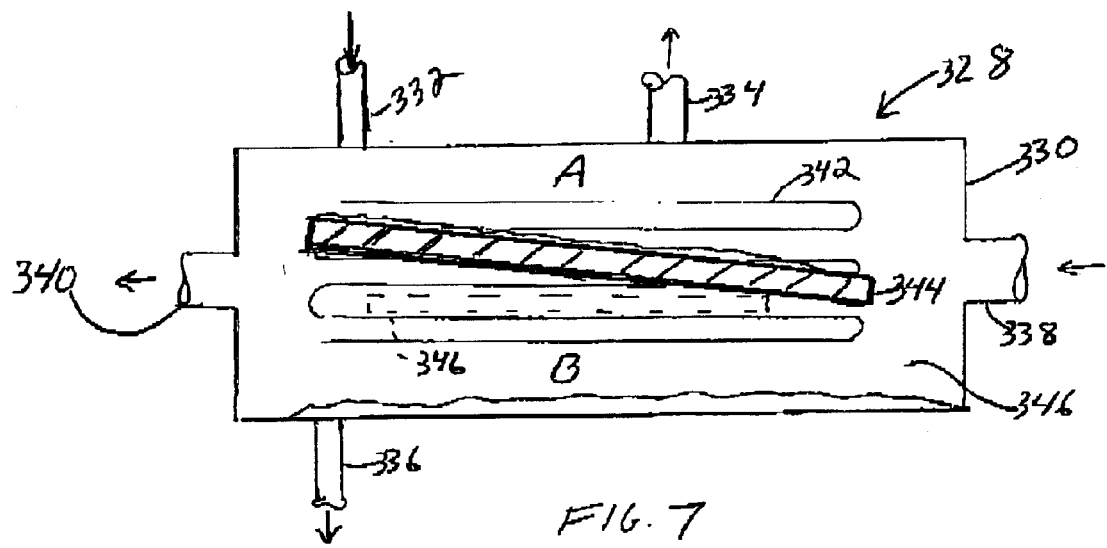
FIG. 7 is a view of the an alternative embodiment of the oil still of the present invention.

In accordance with another embodiment of the present invention, and referring to FIG. 7, a still 328 includes at least one flat separating pan 344 positioned in coil 342, dividing the cavity 346 of vessel 330 into two Zones A and B, and which is angled downwardly such that liquid will flow over its surface. This division by pan 344 effectively separates the oil-laden refrigerant from the refrigerant-laden oil, by creating the two separate zones A and B. Accordingly no immediate mixing of oil-laden refrigerant with refrigerant-laden oil occurs, thereby avoiding the pitfalls of the prior art that allows such mixture and effectively dilutes the separation process. Pan 344 is preferably in intimate contact with coil 342 to facilitate efficient heat transfer with the oily refrigerant and has an elongated, flattened shape. The flattened shape functions to spread the oil-laden refrigerant out in a thin layer which enhances the distillation process and separation of the lubricant from the oil-laden refrigerant. Accordingly, Zone A located in the upper region of cavity 346 functions as the distilling region, wherein the oily refrigerant at about 90–95% refrigerant enters from the evaporator at saturation temperature and pressure. Heat is transferred from the hot refrigerant in the coil and causes the refrigerant portion of the oily refrigerant to vaporize and separate from the oil-laden refrigerant. The separated refrigerant vapor exits through outlet 334.

In Zone B, lubricant, consisting of oil with about 10–40% refrigerant collects, having moved down pan 344 into the bottom of vessel 330.

As an alternative to coil 342, an electric heater 348 shown by dotted lines can be used to supply the necessary heat to the pan.

In operation, oil laden refrigerant which is 90–95% refrigerant enters vessel 330 from the evaporator through inlet 332 onto pan 344, and hot refrigerant enters inlet 338 drawn off the condenser or the compressor discharge line, and circulates through coil 342. Heat is transferred from the hot refrigerant in the coil causing the oil laden refrigerant to reach saturation temperature and results in vaporization of the majority of the refrigerant, which exits as a gas through outlet 334 to the slanted orientation of the pan, liquid flows down the pan through Zone A and drips into Zone B at the bottom of vessel 330. Heating by the refrigerant in the coil continues in Zone B but is directed to the refrigerant-laden oil, causing additional boiling off of remaining refrigerant which flows as vapor out of the vessel through outlet 334 while oil flows out of vessel 330 through outlet 336. Cooled refrigerant in the coil exits the vessel through outlet 340.

Figure 8:
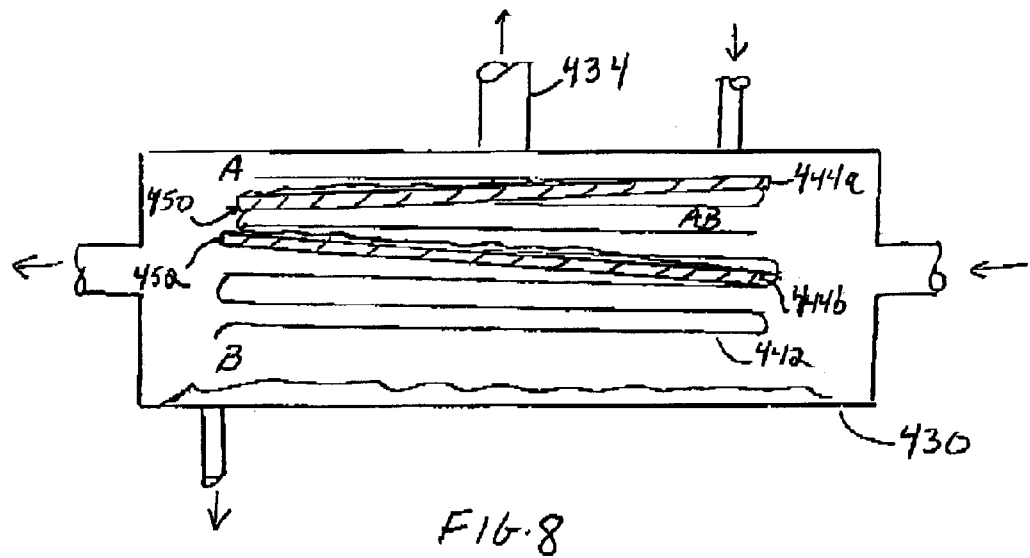
FIG. 8 is an alternative embodiment of the oil still shown in FIG. 7.

Referring now to FIG. 8, an alternative of the embodiment of FIG. 7 is shown. In FIG. 8, two pans 444a and 444b are used, along with the same coil 142 arrangement and outlets and inlets described above. With the embodiment shown in FIG. 8, a third Zone AB is added intermediate to Zones A and B, that acts to further separate refrigerant from the oil laden refrigerant for exiting of vessel 430 through outlet 434. Zone AB functions in a manner similar to that described above for Zone A, acting as a supplementary step to the process described in Zone A. Pans 444a and 444b are each slanted downward, wherein pan 444a has less of an incline than pan 344 and leads the liquid to pan 444b. Pan 444b is slanted in the opposite direction of pan 444a, such that the lower point 450 of pan 444a is almost vertically coincident with the higher point 452 of pan 444b, but sufficiently offset to allow liquid flow from one pan to the next. Operation in Zones A and B, and the remaining inlets and outlets, but for their locations due to the differing pan arrangement; are the same as described above for the FIG. 7 embodiment.

Although preferred embodiments of the present invention have been illustrated and described, other changes will occur to those skilled in the art. It is therefore intended that the scope of the present invention is to be limited only by the scope of the appended claims.

What is claimed is:

1. A lubricant still for use in a compressor for separating lubricant from refrigerant, comprising:

a vessel having an inlet for incoming lubricant laden refrigerant, an outlet for gaseous refrigerant, and an outlet for refrigerant laden lubricant;

a pan including a plurality of partitions for separating transitioning lubricant laden refrigerant from said incoming lubricant-laden refrigerant, wherein said lubricant laden refrigerant progressively changes to said refrigerant laden lubricant closer to said outlet for refrigerant laden lubricant; and means for heating the incoming lubricant laden refrigerant and transitioning lubricant laden refrigerant for facilitating the formation or said gaseous refrigerant and said refrigerant laden lubricant.

2. The lubricant still according to claim 1, wherein said means for heating is integral with said pan.

3. The lubricant still according to claim 2, wherein said means for heating comprises a lubricant with hot refrigerant flowing there through.

4. The lubricant still according to claim 2, wherein said means for heating comprises an electric heater.

5. The lubricant still according to claim 1, wherein the pan and said partitions are integrally formed from the same piece of material.

6. The lubricant still according to claim 1, wherein said lubricant laden refrigerant inlet and refrigerant laden lubricant outlet are connected with said pan.

7. The lubricant still according to claim 1, wherein said pan includes a higher end and a lower end, wherein said outlet for refrigerant laden lubricant is at said lower end and said inlet for lubricant-laden refrigerant is at said higher end.

* * * * *